United States Patent [19]
Langsam

[11] Patent Number: 5,939,520
[45] Date of Patent: Aug. 17, 1999

[54] GAS SEPARATION MEMBRANES BASED ON REGIOSPECIFIC POLYAMIDE-IMIDES

[75] Inventor: Michael Langsam, Allentown, Pa.

[73] Assignee: Air Products and Chemicals, Inc., Allentown, Pa.

[21] Appl. No.: 08/924,729

[22] Filed: Sep. 5, 1997

[51] Int. Cl.$^6$ ................................................. C08G 73/10
[52] U.S. Cl. .................. 528/350; 528/170; 528/172; 528/173; 528/310; 528/322; 528/352; 528/353; 210/500.38; 210/500.39; 428/411.1; 428/473.5; 428/474.5
[58] Field of Search ................................. 528/350, 352, 528/353, 170, 172, 310, 173, 322; 210/500.38, 500.39; 428/411.1, 473.5, 474.5

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 210/23 |
| 4,952,220 | 8/1990 | Langsam et al. | 55/158 |
| 4,954,144 | 9/1990 | Burgoyne, Jr. et al. | 55/16 |
| 5,124,428 | 6/1992 | Yokelson et al. | 528/73 |
| 5,248,319 | 9/1993 | Ekiner et al. | 95/54 |
| 5,266,100 | 11/1993 | Simmons | 55/16 |
| 5,268,487 | 12/1993 | Yang et al. | 548/456 |
| 5,352,272 | 10/1994 | Moll et al. | 96/9 |

OTHER PUBLICATIONS

Kim, T. H., et al. "Reverse Permselectivity" of $N_2$ Over $CH_4$ in Aromatic Polyimides. *Journal of Applied Polymer Science.* vol. 34, pp. 1767–1771. John Wiley & Sons, Inc. (1987).

Maiti, S., et al. "Processable Heat–Resistant Polymers. XIII. Structure—Property Relationship in Polyamideimides." *Journal of Applied Polymer Science.* vol. 28, pp. 225–239. John Wiley & Sons, Inc. (1983).

Maiti, S., et al. "Processable Heat–Resistant Polymers. VII. Synthesis and Characterization of Polyamideimide from N–(p–Carboxyphenyl)trimellitimide and p,p'–Di(aminocyclohexyl)methane." *Journal of Applied Polymer Science.* vol. 27, pp. 4345–4356. John Wiley & Sons, Inc. (1982).

Yang, C–P, et al. "New Poly(amide–Imide)s Syntheses. I. Soluble High–Temperature Poly9amide–Imide)s Derived from 2,5–Bis(4–Trimellitimidophenyl)–3,4–Diphenylthiophene and Various Aromatic Diamines." *Journal of Polymer Science: Part A: Polymer Chemistry.* vol. 30, pp. 1855–1864. John Wiley & Sons, Inc. (1992).

Buys, H. C. W. M., et al. "Aromatic Copolyimide membranes for High Temperature Gas Separations: $H_2/CH_4$, $H_2/N_2$, and $O_2/N_2$." *Journal of Applied Polymer Science.* vol. 41, pp. 1261–1270. John Wiley & Sons, Inc. (1990).

Gao, X., et al. "Structure/Permeability Relationships of Polyamide–Imides." *Journal of Applied Polymer Science.* vol. 54, pp. 1965–1970. John Wiley & Sons, Inc. (1994).

Hong, Y–T, et al. "New Preparation Method of poly(amide–imide)s using direct polycondensation with thionyl chloride and their characterization." *Die Angewandte Makromolekulare Chemie.* vol. 243, pp. 105–122. Huthig & Wepf Verlag, Zug. (1997).

Fritsch, D., et al. "Novel highly permselective 6F–poly(amide–imide)s as membrane host for nano–sized catalysts." *Journal of Membrane Science.* vol. 99, pp. 29–38. Elsevier Science B.V. (1995).

*Primary Examiner*—P. Hampton-Hightower
*Attorney, Agent, or Firm*—Mark L. Rodgers

[57] ABSTRACT

Regiospecific polyamide-imides are cast to form membranes which exhibit superior gas separation properties when compared to polyamide-imide membranes formed from random copolymers. The regiospecific polyamide-imides are synthesized by reacting specific aromatic diimide dicarboxylic acids with select aromatic diamines.

14 Claims, No Drawings

GAS SEPARATION MEMBRANES BASED ON REGIOSPECIFIC POLYAMIDE-IMIDES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to polymeric membranes, and more particularly membranes formed from polyamide-imides, which are useful for separating components of a gas mixture.

The commercial application for gas separation devices based on polymeric materials relies, in part, on maximizing the overall gas flux through the membrane. P. H. Kim, et al., J. Appl. Poly. Sci., 34 1767 (1987), reported that the gas flux for a membrane is relatable to the average space between the polymer chains. In addition, they indicated that the density of the polymer is also related to the overall gas flux. One challenge for commercial applications is to identify polymers which have both very high flux and good thermo-mechanical properties. It has generally been observed that to achieve high overall flux requires having a polymer with low chain-chain interactions. This can be exemplified by polymers such as poly(dimethylsiloxane) or poly(4-methyl-1-pentene). These materials have rather high gas flux values, but due to their low chain-chain interaction, they also have low glass transition temperatures (Tg). As a consequence, these materials require either special processing conditions to build-in chemical and physiochemical crosslinking or else they can only be used at low application temperatures. By contrast, polymers with strong chain-chain interactions have rather high Tg values but typically exhibit low gas flux.

Polyimides, which generally have strong chain-chain interactions and high Tg values, have been reported to have good gas flux values for certain specific structures.

Specifically, U.S. Pat. No. 3,822,202 (1974); Re 30,351 (1980) discloses a process for separating fluids using a semi-permeable membrane made from polyimides, polyesters or polyamides. The repeating units of the main polymer chain of these membranes are distinguished in that such repeating units have at least one rigid divalent subunit, wherein the two main chain single bonds extending from the subunit are not colinear, the subunit is sterically unable to rotate 360° around at least one of these bonds, and has 50% or more of its main chain atoms as members of aromatic rings.

S. Maiti and A. Ray, "Processable Heat-Resistant Polymers. VII. Synthesis and Characterization of Polyamideimide from N-(p-Carboxyphenyl)trimellitimide and p,p'-Di (aminocyclohexyl)methane", J. App. Poly. Sci., vol. 27, 4345–4356 (1982) discloses heat stable polyamideimides; and in "Processable Heat-Resistant Polymers. XIII. Structure-Property Relationship in Polyamideimides", J. App. Poly. Sci., vol. 28, 225–239 (1983) report the relationship between the structure and the properties of heat stable polyamideimides.

Yang, et al., "New Poly(amide-imide)s Synthesis", J. of Poly. Sci., Part A: Polymer Chemistry, vol. 30, 1855–1864 (1992), discloses the synthesis of aromatic poly(amide-imide)s having high inherent viscosities by direct polycondensation reaction of 2,5-bis(4-trimellitimidophenyl)-3,4-diphenylthiophene and aromatic diamines. Yang, et al., U.S. Pat. No. 5,268,487, discloses the preparation of heat resistant poly(amide-ether-imide)s having improved strength and processability.

H. C. W. M. Buys, et al., "Aromatic Copolyimide Membranes for High Temperature Gas Separations: $H_2/CH_4$, $H_2/N_2$, and $O_2/N_2$", J. App. Poly. Sci., vol. 41, 1261–1270 (1990) discloses a study done to assess the effect of polymer molecular structure of aromatic copolyimide membranes on the permeability and perm selectivity of gases.

X. Gao and F. Lu, J. appl. Poly. Sci., vol. 54, 1965–1970 (1994) reported a study on structure/permeability correlations for a family of aromatic polyamide-imides. It was reported that the introduction of bulky groups in the polymer chain tended to increase permeability without a corresponding decrease in perm selectivity. The synthesis used was a solid state thermal imidization process using TMAC and a single diamine to form a non-regiospecific poly(amide-imide).

Yokelson, et al., U.S. Pat. No. 5,124,428, discloses heat resistant fiber based on amide-imide resins. The resins were formed by reacting toluene diamine with trimellitic anhydride chloride to form a random polyamide-imide which is solution imidized to greater than 96%.

The work of Fritsch, et al., "Novel Highly Permselective 6F-poly(amide-imide)s as Membrane Heat for Nano-sized Catalysts", J. Memb. Sci., 99, 29–38 (1995), uses the regiospecific PAI materials for gas separation but employs the hexafluoro isopropyl group (either as 6FDA or 6EF44) to ensure solubility characteristics. This increases costs and falls out of the commercially important $P/\alpha$ ranges.

BRIEF SUMMARY OF THE INVENTION

The present invention is a class of gas separation membranes formed from regiospecific polyamide-imides. The polyamide-imides used in this invention are formed by reacting specific aromatic diimide dicarboxylic acids with selected aromatic diamines. By using carefully selected reactants, the resultant polyamide-imide has a predetermined polymeric structure which results in improved gas separation properties for membranes formed from these polymers compared to those formed from random copolymers.

The polyamide-imides can be cast to form any type of membrane structure, such as flat sheets, spiral wound, or hollow fibers. The resultant membranes are useful for a wide variety of gas separation applications, including separating O2/N2, He/N2, and CO2/CH4.

BRIEF DESCRIPTION OF SEVERAL VIEWS OF THE DRAWINGS

DETAILED DESCRIPTION OF THE INVENTION

This invention relates to the preparation of membranes based on regiospecific polyamide-imides. By using regiospecific polyamide-imides, the gas transport properties of the membranes can be tailored to meet the specific requirements of a particular gas separation application.

Table 1 below sets out the chemical names and structures for the acronyms used in this specification.

TABLE 1

| Chemical Names (Acronyms) | Chemical Structures |
|---|---|
| Trimellitic Acid Anhydride (TMA) | (structure: benzene with HO-C(=O)-, and anhydride group) |
| Metaphenylene Diamine (mPda) | $H_2N$—C$_6$H$_4$—$NH_2$ (1,3) |
| Toluene Diamine (TDA (IM))[(1)] | Toluene with two $NH_2$ groups (2,3 position shown) and $CH_3$ |
| | Toluene with two $NH_2$ groups and $CH_3$ (alternate isomer) |
| Fluorenyl Bisphenol (4HBAF) | 9,9-bis(aminophenyl)fluorene structure with two $H_2N$ groups |
| Diethyl Toluene Diamine (DETDA (IM))[(1)] | Benzene with $CH_3$, two $NH_2$, two $C_2H_5$ (H$_5$C$_2$) groups |
| | Benzene with $C_2H_5$, two $NH_2$, two $C_2H_5$ (H$_5$C$_2$) groups |
| Diaminomesitylene (DAM) | Benzene with three $CH_3$ and two $NH_2$ groups |

TABLE 1-continued

| Chemical Names (Acronyms) | Chemical Structures |
|---|---|
| 1,5 Naphthalene Diamine (1,5 NAPda) | 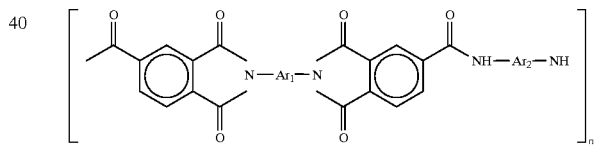 |

[(1)] (IM) = isomer mix

The regiospecific polyamide-imide membranes are prepared by reacting aromatic diimide dicarboxylic acids (DIDC) of the structural formula:

$$HOOC-C_6H_3(CO)_2N-Ar_1-N(CO)_2C_6H_3-COOH$$

wherein $Ar_1$ is selected from the group consisting of mPda, 2,6 TDA, TDA(IM), and NAPda, with an aromatic diamine represented by:

$$H_2N-Ar_2-NH_2$$

wherein $Ar_2$ is DAM or mixtures of aromatic diamines having $Ar_2$ as DAM and NAPda.

In carrying out the polymerization, the above aromatic diimide dicarboxylic acids can be mixed with aromatic diimide dicarboxylic acids wherein $Ar_1$ is DAM.

The resultant polyamide-imide which forms the gas separation membrane has the general structural formula:

$$\left[ \cdots C_6H_3(CO)_2N-Ar_1-N(CO)_2C_6H_3-CONH-Ar_2-NH \cdots \right]_n$$

wherein $Ar_1$ and $Ar_2$ are as set out above, and n is from 25–160 (corresponding to a molecular weight $\overline{M}n$ of about 15,000 to 100,000) and preferably from 40–80 ($\overline{M}n$ of about 25,000 to 50,000).

It should be noted that the DIDC monomer is a modified isophthalic acid wherein the diphthalimido structure is bridging the two phenylcarboxylic acid groups. These materials have surprisingly good solubility in aprotic solvents such as N-methylpyrrolidone (NMP) and dimethylacetamide (DMAc). This is contrasted to a variety of commercial polyamides such as Nomex® and Kevlar® which are soluble in only very aggressive solvent systems.

We have found that the gas transport properties for these regiospecific PAI materials can be controlled by the choice of aromatic groups placed in the imide ($Ar_1$) and the amide ($Ar_2$) sections of their regiospecific PAI material. Specifically, we have found that the imide linkage ($Ar_1$) should be as small as possible to maximize selectivity, and that the amide linkage ($Ar_2$) should be as large as DAM, but not DETDA, to maximize permeability and selectivity. These effects are illustrated by the data reported in Tables 3–7 below.

After the polymerization is carried out, the polymer is cast into a membrane using conventional technology. The membrane may be in the form of a flat sheet, spiral wound sheet, hollow fibers or any other structure which can be cast from polymers. The resultant membranes are useful for separating components of a feed gas mixture comprising at least two components which have different rates of permeability through the membrane by bringing the feed gas mixture into contact with the membrane and allowing one component to selectively permeate through the membrane thereby separating the permeating component from the feed gas mixture. Typical feed gas mixtures containing components which can be separated in this manner include, among others, mixtures containing $O_2/N_2$; $He/N_2$; $CO_2/CH_4$; and the like.

Prior to being utilized in gas separation applications, membranes made from these regiospecific polyamide-imides may be coated; i.e. defect repaired, using conventional polymeric coating materials. Typical coating materials include polysiloxanes, polyphosphazenes, and the like.

The following examples are presented to better illustrate the present invention and are not meant to be limiting.

EXAMPLE 1

Preparation of 2,6 TDA-DIDC

The aromatic diimide dicarboxylic acids used in the present invention can be prepared by the condensation of two moles of 1,2,4 benzene tricarboxylic anhydride with one mole of the selected aromatic diamine. The general procedure is detailed for 2,6 TDA-DIDC.

In a 500 ml 3-neck round bottom flask equipped with $N_2$ purge, mechanical stirrer and dean-stark trap were placed the following components: TMA (25.0556 g 0.13 moles); DMF (75 ml). The mixture was heated to 60° C. for 1 hour to dissolve the TMA. Then 2,6TDA (7.9411 g; 0.065M), DMF (25 ml) and mXylene (20 ml) were added to the reaction mixture and the dean-stark trap was filled with mXylene. The temperature was raised to 190° C. and water (2.5–3.0 ml) distilled off of the reaction mixture with 70 ml of mXylene/DMF solvent mixture over 3 hours. The 2,6TDA-DIDC was soluble in the reaction mixture at 190° C. but dropped out of DMF solvent on cooling to room temperature. The solid was filtered, air dried for 24 hours then vacuum dried at 200° C. for 48 hours. The dried monomer was sent for TGA/DSC to determine residual solvent and melting point. The 2,6 TDA/DIDC was used in the polymerization without further purification or analysis.

EXAMPLES 2–6

Preparation of other aromatic diimide dicarboxylic acids

The preparation of the other $Ar_1$ DIDC noted in Table 2 were carried out using the same general procedure set out in Example 1, but with variations in the reaction solvent to account for solubility concerns of the product $Ar_1$ DIDC monomer. For example: DAM and DETDA used a xylene/DMF (80/20) reaction mixture because of the solubility of the product material in all DMF. All of the other $Ar_1$ DIDC materials were prepared from an all DMF reaction mixture.

As an exception to the general work-up procedure for these DIDC monomers we found that TDA(IM)-DIDC there was no precipitation of these monomers from the DMF/m-Xylene reaction solvent system after 24 hours. The phase separation of solid diimide dicarboxylic acid was accomplished by slurrying the organic solution with ten fold excess water/ice in a waring blender. The solid diimide dicarboxylic acid was filtered off of the liquid phase and then dried as above.

The specific structures and melting points for the aromatic diimide dicarboxylic acids prepared are set out in Table 2 below.

TABLE 2

$Ar_1$ Diimide-Dicarboxylic Acid Candidate Monomers

| Example | $Ar_1$ | MP[1] |
|---|---|---|
| 1 | 2,6 TDA | 393 |
| 2 | mPda | 399 |
| 3 | TDA (IM) | 329, 404 |
| 4 | DAM | 356 |
| 5 | NAPda | 504 |
| 6 | DETDA (IM) | 352, 397 |

[1]in ° C. by DSC techniques

EXAMPLE 7

Polymerization of 2,6 TDA-DIDC with DAM

The preparation of regiospecific PAI from $Ar_1$DIDC and $H_2NAr_2$—$NH_2$ was carried out using the Yamazaki reaction in the following manner. This procedure was employed by Yang and coworkers, New Poly(amide-imide)s Synthesis, J. Poly Sci: Part A: Polymer Chemistry, vol. 30, 1855–1864 (1992). The general procedure is detailed for 2,6 TDA-DIDC combined with DAM: In a 250 ml 3 neck round bottom flask equipped with mechanical stirrer and $N_2$ purge were placed the following components: 2,6 TDA-DIDC (9.4076 gal, 0.02 m); DAM (3.0044 gm, 0.02 m); $CaCl_2$ (10.1 gm); pyridine (20 ml 0.25 moles) and NMP (60 ml). The reaction mixture was heated to 100° C. for 30 minutes. The reaction mixture was then cooled to 0° C. with wet ice. Then TPP (13 ml 0.05 m) was added with NMP (20 ml) and the reaction mixture was heated to 100° C./3 hours with rapid stirring. After three hours the reaction mixture was cooled, diluted with 50 ml NMP and precipitated in $H_2O$ using a 1 gallon Waring® blender. The solid was washed with water/methanol mixtures as 2/1; 1/2; all methanol using the Waring blender for efficient extraction of inorganic salts and phosphate esters. The polymer was then air dried overnight and vacuum dried for 24 hrs/150° C. The materials were sent for molecular weight determination (weight average molecular weight [$\overline{M}w$] by gel permeation chromatography [GPC]).

Polymer samples were converted into mechanically stable dense films using the following procedure: Polymer (~10 grams) was dissolved in ~70 grams of NMP to form an ~12.5% dope solution. The dope solution was passed through a Zitex® PTFE "Coarse" grade pressure filter. After degassing, the dope solution was cast on 150 mm rings and dried to a free standing film after 8 hours at 100° C./200 mm pressure. This dense film was subsequently dried for 96 hours/0.1 micron/295° C. TGA analysis indicated less than 0.4% residual solvent. The dried dense films were stored under $N_2$ prior to testing. All gas transport measurements were performed in a microprocessor controlled manometric cell. The results are reported in Table 3 below.

EXAMPLES 8–31

Using the polymerization procedure noted in Example 7, regiospecific polyamideimides were prepared, dried and converted into mechanically stable dense films. The structures and gas separation properties of these films are set out in Tables 3–6 below The results reported in Table 4 follow the same trend as illustrated in Table 3 for DAM-DIDC: for mPDA and DAM

TABLE 3

Effects of $Ar_2$ Unit on Polymer Characteristics of Regiospecific PAI Based on DAM-DIDC

| Ex. | $Ar_2$[1] | Permeability Coefficient | | | | | Selectivity | | | GPC[3] |
| | | $O_2$ | $N_2$ | He | $CO_2$ | $CH_4$ | $O_2/N_2$ | He/$N_2$ | $CO_2/CH_4$ | $\bar{M}w$ |
|---|---|---|---|---|---|---|---|---|---|---|
| 8 | mPda | 1.45 | .218 | 19.0 | 7.81 | — | 6.67 | 87.2 | — | 89.8 |
| 9 | 1,5 NAPda | 1.47 | .222 | 17.9 | 7.24 | — | 6.62 | 80.6 | — | |
| 10 | 2,6 TDA | 1.52 | .230 | 18.2 | 7.91 | — | 6.61 | 79.1 | — | 83.4 |
| 11 | 2,4 TDA | 2.01 | .308 | 21.7 | 10.4 | — | 6.53 | 70.5 | — | |
| 12 | TDA (IM)[2] | 1.85 | .281 | 20.3 | 9.93 | — | 6.58 | 72.3 | — | |
| 13 | DAM | 3.47 | .536 | 36.3 | 17.6 | .441 | 6.47 | 67.7 | 39.9 | 73.8 |
| 14 | DETDA (IM)[2] | 4.75 | .808 | 37.4 | 25.1 | — | 5.88 | 46.3 | — | 52.7 |
| 15 | 4 HBAF | 5.93 | 1.10 | 35.8 | 34.1 | 1.06 | 5.39 | 32.5 | 32.2 | 104.4 |

[1]Organic structures associated with these monomer acronyms are in Table 1.
[2]IM = Isomer Mix; typically 80% 2,4 and 20% 2,6.
[3]In NMP - LiCl (1%) 30° C.

The above data show that $\alpha$ ($O_2/N_2$) remains relatively constant as the amide ($Ar_2$) component increases in ring alkylation from mPDA to DAM. Simultaneously, the P($O_2$) increases by a factor of about 2.4. This observation indicates that the ring alkylation has no appreciable effect on $\alpha$ ($O_2/N_2$) but a substantial effect on P($O_2$). The higher alkylated structure DETIDA or the bulkier structured 4HBAF exhibit increased P($O_2$), but with the expected decrease in $\alpha$ ($O_2/N_2$).

In a further study of a larger imide ($Ar_1$) group on the same range of amide ($Ar_2$) link, we prepared the materials set out in Table 4 below.

in the amide ($Ar_2$) position, the $\alpha$ ($O_2/N_2$) is constant but with increasing P($O_2$). When the bulkier diamines, such as DETDA or 4HBAF, are used in the amide ($Ar_2$) position, P($O_2$) increases while $\alpha$ ($O_2/N_2$) decrease.

The results reported in Table 3 and 4 above show that it is preferred to have DAM in the amide ($Ar_2$) position of the polymer and, based on the comparison of DAM-DIDC (Table 3) to DETDA-DIDC (Table 4), a smaller diamine in the imide ($Ar_1$) position. This conclusion is further reinforced by the data presented in Table 5 below.

TABLE 4

Effects of $Ar_2$ Unit on Polymer Characteristics of Regiospecific PAI Based on DETDA-DIDC

| Ex. | $Ar_2$[1] | Permeability Coefficient | | | | | Selectivity | | | GPC[3] |
| | | $O_2$ | $N_2$ | He | $CO_2$ | $CH_4$ | $O_2/N_2$ | He/$N_2$ | $CO_2/CH_4$ | $\bar{M}w$ |
|---|---|---|---|---|---|---|---|---|---|---|
| 16 | mPda | 2.61 | .454 | 21.4 | 14.5 | .406 | 5.75 | 47.1 | 35.7 | 109.7 |
| 17 | DAM | 4.94 | .881 | 35.9 | 27.0 | .808 | 5.61 | 40.7 | 33.4 | 73.3 |
| 18 | DETDA (IM)[2] | 6.49 | 1.28 | 38.4 | 36.7 | 1.39 | 5.07 | 30.0 | 26.4 | 90.9 |
| 19 | 4 HBAF | 6.88 | 1.37 | 34.8 | 42.5 | 1.66 | 5.02 | 25.4 | 25.6 | 102.1 |

[1]Organic structures associated with these monomer acronyms are in Table 1.
[2]IM = Isomer Mix; typically 80% 2,4 and 20% 2,6.
[3]In NMP - LiCl (1%) 30° C.

TABLE 5

Effects of Ar$_1$ Unit on Polymer Characteristics of Regiospecific PAI

| | | | Permeability Coefficient | | | | Selectivity | | | GPC[3] |
| | | | | | | | O$_2$/ | He/ | CO$_2$/ | |
| Ex. | Ar$_1$[1] | Ar$_2$[1] | O$_2$ | N$_2$ | He | CO$_2$ | CH$_4$ | N$_2$ | N$_2$ | CH$_4$ | M̄w |
|---|---|---|---|---|---|---|---|---|---|---|---|
| 20 | mPda[4] | DAM | .259 | .0285 | 7.61 | 1.21 | .018 | 9.09 | 267 | 89.6 | — |
| 7 | 2,6 TDA | DAM | .747 | .0949 | 14.1 | 2.11 | — | 7.87 | 149 | — | 61.7 |
| 13 | DAM | DAM | 3.47 | .536 | 36.3 | 17.6 | .441 | 6.47 | 67.7 | 39.9 | 73.8 |
| 17 | DETDA[2] | DAM | 4.94 | .881 | 35.9 | 27.0 | .808 | 5.61 | 39.7 | 33.4 | 73.3 |
| 21 | mPda | DETDA[2] | .528 | .0781 | 9.63 | 1.94 | .0427 | 6.76 | 123 | 45.4 | 53.2 |
| 14 | DAM | DETDA[2] | 4.75 | .808 | 37.4 | 25.1 | — | 5.88 | 46.3 | — | 52.7 |
| 22 | 2,6 TDA | DETDA[2] | 1.24 | .191 | 17.4 | 8.02 | .108 | 6.56 | 92.6 | 75.0 | 48.8 |
| 18 | DETDA[2] | DETDA[2] | 6.49 | 1.28 | 38.4 | 36.7 | 1.39 | 5.07 | 30.0 | 26.4 | 90.9 |

[1]Organic structures associated with these monomer acronyms are in Table 1.
[2]IM = Isomer Mix; typically 80% 2,4 and 20% 2,6.
[3]In NMP - LiCl (1%) 30° C.
[4]Polymer did not redissolve on casting.

Polymers in Table 5 were prepared to test the effects of increasing the size of the imide (Ar$_1$) group while keeping the amide (Ar$_2$) group either DAM (Examples 20, 7, 13, 17) or DETDA (Examples 21, 22, 14, 18). As shown in the Table, P(O$_2$), P(He), P(CO$_2$) increased while α (O$_2$/N$_2$) and α (He/N$_2$) decreased. Generally, the selectivity for O$_2$/N$_2$ and He/N$_2$ are superior for the materials where DAM is in the amide (Ar$_2$) position compared to DETDA in the amide (Ar$_2$) position.

TABLE 6

Symmetric Homopolymers

| | | | Permeability Coefficient | | | | Selectivity | | | GPC[3] |
| | | | | | | | O$_2$/ | He/ | CO$_2$/ | |
| Ex. | Ar$_1$[1] | Ar$_2$[1] | O$_2$ | N$_2$ | He | CO$_2$ | CH$_4$ | N$_2$ | N$_2$ | CH$_4$ | M̄w |
|---|---|---|---|---|---|---|---|---|---|---|---|
| 23 | mPda | mPda | .0607 | .00715 | 2.77 | .181 | — | 8.49 | 380 | — | 108 |
| 24 | TDA(IM)[2] | TDA(IM)[2] | .239 | .0280 | 6.78 | 1.12 | .0145 | 8.53 | 242 | 77.2 | 102 |

[1]Organic structures associated with these monomer acronyms are in Table 1.
[2]IM = Isomer Mix; typically 80% 2,4 and 20% 2,6.
[3]In NMP - LiCl (1%) 30° C.

As can be seen from the results reported in Table 6, the symmetric polymers, while soluble, have low permeability values.

The copolymers defined in Table 7 also demonstrate that there is an improvement by putting the smallest diamines in the imide (Ar$_1$) position and DAM in the amide (Ar$_2$) position. This is evidenced by a comparison of Example 25 vs. Example 29 and Example 26 vs. Example 31. Finally, in Table 8, we again compare the effects of mPda and DETDA (Example 20 vs. Example 8) and mPda and DETDA (Example 21 vs. Example 16). These also support the difference between DAM and DETDA.

TABLE 7

Effects of Copolymerization in Ar$_1$ and Ar$_2$ on Polymer Characteristics of Regiospecific PAI

| | | | Permeability Coefficient | | | | Selectivity | | | GPC[2] |
| | | | | | | | O$_2$/ | He/ | CO$_2$/ | |
| Ex. | Ar$_1$[1] | Ar$_2$[1] | O$_2$ | N$_2$ | He | CO$_2$ | CH$_4$ | N$_2$ | N$_2$ | CH$_4$ | Mw |
|---|---|---|---|---|---|---|---|---|---|---|---|
| 25 | 2,6 TDA (.5) DAM (.5) | DAM | 1.59 | .234 | 22.2 | — | — | 6.79 | 94.9 | — | 68.5 |
| 26 | mPda (.25) DAM (.25) | DAM | 1.07 | .141 | 17.2 | 4.91 | .0704 | 7.59 | 122 | 69.7 | 109.7 |
| 27 | mPda (.3) DAM (.2) | DAM | .759 | .0920 | 14.2 | 3.61 | .0445 | 8.25 | 154 | 81.1 | 215 |
| 28 | mPda (.4) | DAM | .447 | .0512 | 10.3 | 1.96 | — | 8.73 | 201 | — | |

TABLE 7-continued

Effects of Copolymerization in $Ar_1$ and $Ar_2$ on Polymer Characteristics of Regiospecific PAI

| Ex. | $Ar_1^{(1)}$ | $Ar_2^{(1)}$ | Permeability Coefficient | | | | | Selectivity | | | $GPC^{(2)}$ |
|---|---|---|---|---|---|---|---|---|---|---|---|
| | | | $O_2$ | $N_2$ | He | $CO_2$ | $CH_4$ | $O_2/N_2$ | $He/N_2$ | $CO_2/CH_4$ | Mw |
| 29 | DAM DAM | 2,6 TDA (.25) DAM (.25) | 2.31 | .352 | 28.3 | 11.3 | — | 6.56 | 80.4 | — | 71.8 |
| 30 | DAM | mPda .1 DAM .4 | 2.91 | .449 | 31.8 | 14.7 | — | 6.48 | 70.8 | — | 75.4 |
| 31 | DAM | mPda .25 DAM .25 | 2.19 | .331 | 25.2 | 11.0 | — | 6.52 | 74.6 | 74.9 | |
| 32 | DAM (.25) NAPDA (.25) | DAM (.25) NAPDA (.25) | .810 | .100 | 13.7 | 4.36 | .055 | 810 | 137 | 79.2 | |

$^{(1)}$Organic structures associated with these monomer acronyms are in Table 1.
$^{(2)}$In NMP - LiCl (1%) 30° C.

TABLE 8

Comparison of Placement Effects

| Ex | $AR_1$ | $Ar_2^{(1)}$ | Permeability Coefficient | | Selectivity | |
|---|---|---|---|---|---|---|
| | | | $O_2$ | He | $O_2/N_2$ | $He/N_2$ |
| 20 | mPda | DAM | .259 | 7.61 | 9.09 | 267 |
| 8 | DAM | mPda | 1.45 | 19.0 | 6.67 | 87.2 |
| 21 | mPda | DETDA | .528 | 9.63 | 6.76 | 123 |
| 16 | DETDA | mPda | 2.61 | 21.4 | 5.75 | 47.1 |

$^{(1)}$Organic structures associated with these monomer acronyms are in Table 1.

The advantage of these copolymer materials are that they are soluble in aprotic solvents such as NMP and are completely defined as to the placement of $Ar_1$ and $Ar_2$ groups.

We have demonstrated in Tables 3–8 that the ideal material from a P/α consideration will have either mPda, TDA or a combination of mPda/DAM or NAPda/DAM in the $Ar_1$ position and either DAM or DAM/NAPda in the $Ar_2$ position.

Having thus described the present invention, what is now deemed appropriate for Letters patent is set out in the following claims.

I claim:

1. A semi-permeable membrane formed from a regiospecific polyamide-imide comprising units having the structural formula:

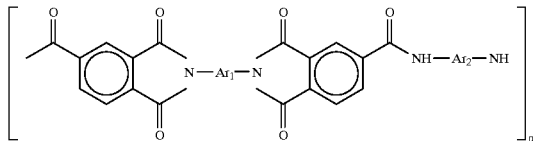

wherein each $Ar_1$ is independently metaphenylene diamine, 2,6 toluene diamine, 2,4 toluene diamine, or naphthalene diamine; $Ar_2$ is diaminomesitylene; and n is from 25 to 160.

2. A semi-permeable membrane in accordance with claim 1 wherein said regiospecific polyamide-imide further comprises structural units wherein $Ar_1$ is diaminomesitylene.

3. A semi-permeable membrane in accordance with claim 1 wherein said regiospecific polyamide-imide further comprises structural units wherein $Ar_2$ is naphthalene diamine.

4. A membrane in accordance with claim 1 which is in the form of a flat sheet, spinal wound sheet, or hollow fiber.

5. A membrane in accordance with claim 1 wherein $Ar_1$ is m-phenylene diamine.

6. A membrane in accordance with claim 1 which has been coated with a thin polymeric film.

7. A membrane in accordance with claim 6 wherein said thin polymeric film is polysiloxane or polyphosphazene.

8. A membrane in accordance with claim 1 wherein n is from 40 to 80.

9. A process for separating a component from a gas mixture having at least two components, said process comprising bringing said gas mixture into contact with a semi-permeable membrane formed from a regiospecific polyamide-imide comprising units having the structural formula:

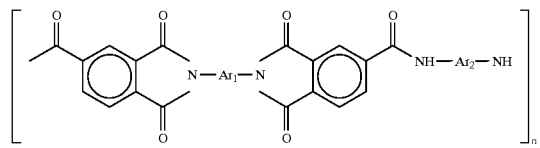

wherein each $Ar_1$ is independently metaphenylene diamine, 2,6 toluene diamine, 2,4 toluene diamine, or naphthalene diamine; $Ar_2$ is diaminomesitylene; and n is from 25 to 160 such that one component of said gas mixture selectively permeates the membrane, thereby separating that component from the gas mixture.

10. A process in accordance with claim 9 wherein said membrane is in the form of hollow fibers.

11. a process in accordance with claim 9 wherein said gas mixture contains nitrogen and oxygen.

12. A process in accordance with claim 11 wherein said gas mixture is air.

13. A process in accordance with claim 9 wherein said regiospecific polyamide-imide further comprises structural units wherein $Ar_1$ is diaminomesitylene.

14. A process in accordance with claim 9 wherein said regiospecific polyamide-imide further comprises structural units wherein $Ar_2$ is naphthalene diamine.

* * * * *